United States Patent
Kuo et al.

(10) Patent No.: US 8,154,510 B2
(45) Date of Patent: Apr. 10, 2012

(54) METHOD FOR CONSTITUTING IDENTIFICATION CODE UTILIZED IN A WIRELESS HUMAN INPUT DEVICE AND WIRELESS HUMAN INPUT SYSTEM THEREOF

(75) Inventors: Ying-Yu Kuo, Taipei (TW); Adrianus Carolus-Antonius Vander Vorst, Taipei (TW)

(73) Assignee: Transpacific Electronics, LLC, Wilmington, DE (US)

( * ) Notice: Subject to any disclaimer, the term of this patent is extended or adjusted under 35 U.S.C. 154(b) by 890 days.

(21) Appl. No.: 10/813,096

(22) Filed: Mar. 31, 2004

(65) Prior Publication Data

US 2005/0219203 A1   Oct. 6, 2005

(30) Foreign Application Priority Data

Jul. 25, 2003   (TW) ................ 92120321 A

(51) Int. Cl.
*G09G 5/00*   (2006.01)
(52) U.S. Cl. .......................... 345/156; 455/73
(58) Field of Classification Search .......... 345/107, 345/156–184; 380/28; 707/100; 257/200; 340/573.1; 342/42, 44, 50, 51; 320/108; 375/295
See application file for complete search history.

(56) References Cited

U.S. PATENT DOCUMENTS

| | | | |
|---|---|---|---|
| 5,854,621 A * | 12/1998 | Junod et al. | 345/158 |
| 6,658,236 B1 * | 12/2003 | Liu et al. | 455/76 |
| 6,888,898 B1 * | 5/2005 | Chenes | 375/295 |
| 2003/0160767 A1 * | 8/2003 | Wong et al. | 345/169 |
| 2004/0005052 A1 * | 1/2004 | Maeda | 380/28 |
| 2005/0162396 A1 * | 7/2005 | Meckesheimer et al. | 345/169 |
| 2005/0200594 A1 * | 9/2005 | Hsieh | 345/156 |

FOREIGN PATENT DOCUMENTS

TW   321751   12/1997

* cited by examiner

*Primary Examiner* — Amare Mengistu
*Assistant Examiner* — Jennifer Zubajlo
(74) *Attorney, Agent, or Firm* — Christensen O'Connor Johnson Kindness PLLC

(57) ABSTRACT

A method for constituting identification code utilized in a wireless human input device includes the following steps. Step A is to save a predetermined identification code in a non-electrical memory of a wireless human receiving device. Step B is that the wireless human transmitting device sends a packet contained an identification code with the same value as the predetermined identification code to the wireless human receiving device during the wireless human transmitting device being first time set up. The identification code is automatically generated by micro controller of the wireless human transmitting device. Step C is that the wireless human receiving device receives the packet in step B. Step D is that the computer detects if the wireless human receiving device in step C can receive normally via executing program codes and the computer reads the memory of the wireless human receiving device via executing the program codes in case of normal receiving being detected, and then the computer compares the predetermined identification code to the read data and outputs a message of the wireless human input device being normally operated if a result is true after comparison.

19 Claims, 6 Drawing Sheets

METHOD FOR CONSTITUTING IDENTIFICATION CODE UTILIZED IN A WIRELESS HUMAN INPUT DEVICE AND WIRELESS HUMAN INPUT SYSTEM THEREOF

FIELD OF THE INVENTION

The present invention relates to a method for constituting identification codes utilized in a wireless human input device to avoid problem of data interference and, particularly, to a method with which a wireless human transmitting device still can avoid problem of data interference without using memory devices and also to a method with which a failure resulting from first time setting up can be avoided because of different identification codes between the wireless human transmitting device and the corresponding wireless human receiving device.

BACKGROUND OF THE INVENTION

U.S. Pat. No. 5,854,621 entitled "WIRELESS MOUSE" discloses a communication system for receiving signals representing displacement action of a peripheral device. The communication system includes a first peripheral device and a receiving unit. The first peripheral device has to include a first non-volatile memory device for storing a first identifier. The receiving unit includes a second non-volatile memory device for storing the first identifier and other authorized identifiers of the peripheral device. Although U.S. Pat. No. 5,854,621 can solve problem of data interference during data transmission and receipt between the peripheral device and receiving unit, the non-volatile memory device has to be used in the transmitting peripheral device for storing the identifier permanently. However, using the non-volatile memory results in increasing production cost and this is deficiency of U.S. Pat. No. 5,854,621.

SUMMARY OF THE INVENTION

A main object of the present invention is to provide a method for constituting identification codes utilized in a wireless human input device and a wireless human input system thereof, with which problem of data interference can be solved without using memory devices.

Another object of the present invention is to provide a method for constituting identification codes utilized in a wireless human input device, with which a failure resulting from first time setting up can be avoided because of different identification codes of the wireless human input device and a message of the wireless human input device having been set up normally can be output on a computer.

BRIEF DESCRIPTION OF THE DRAWINGS

The present invention can be more fully understood by reference to the following description and accompanying drawings, in which.

DETAILED DESCRIPTION OF THE INVENTION

Figure 1:
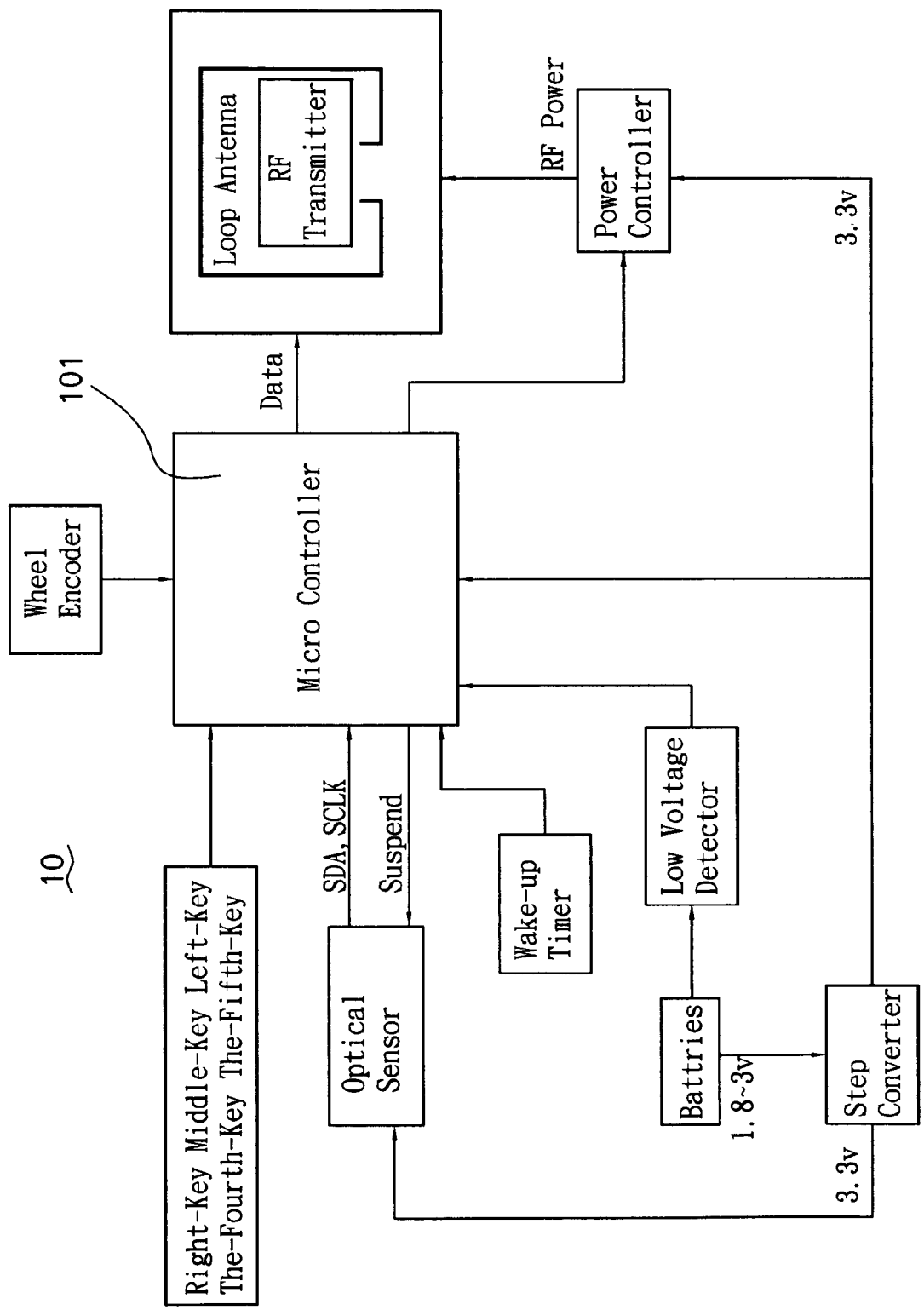
FIG. 1 is a block diagram illustrating a method according to the present invention applied to a wireless mouse.
Figure 2:
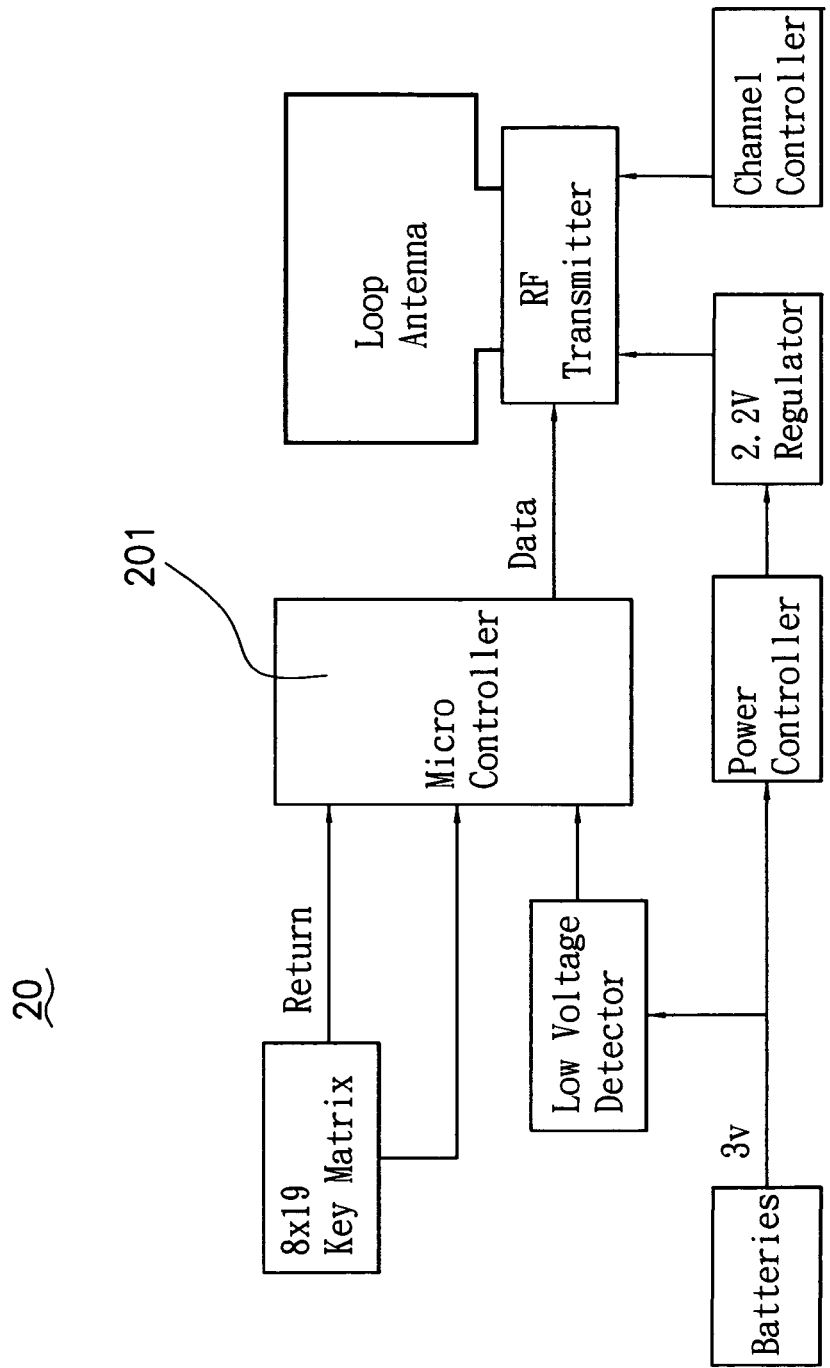
FIG. 2 is a block diagram illustrating the method of the present invention applied to a wireless keyboard.
Figure 3:
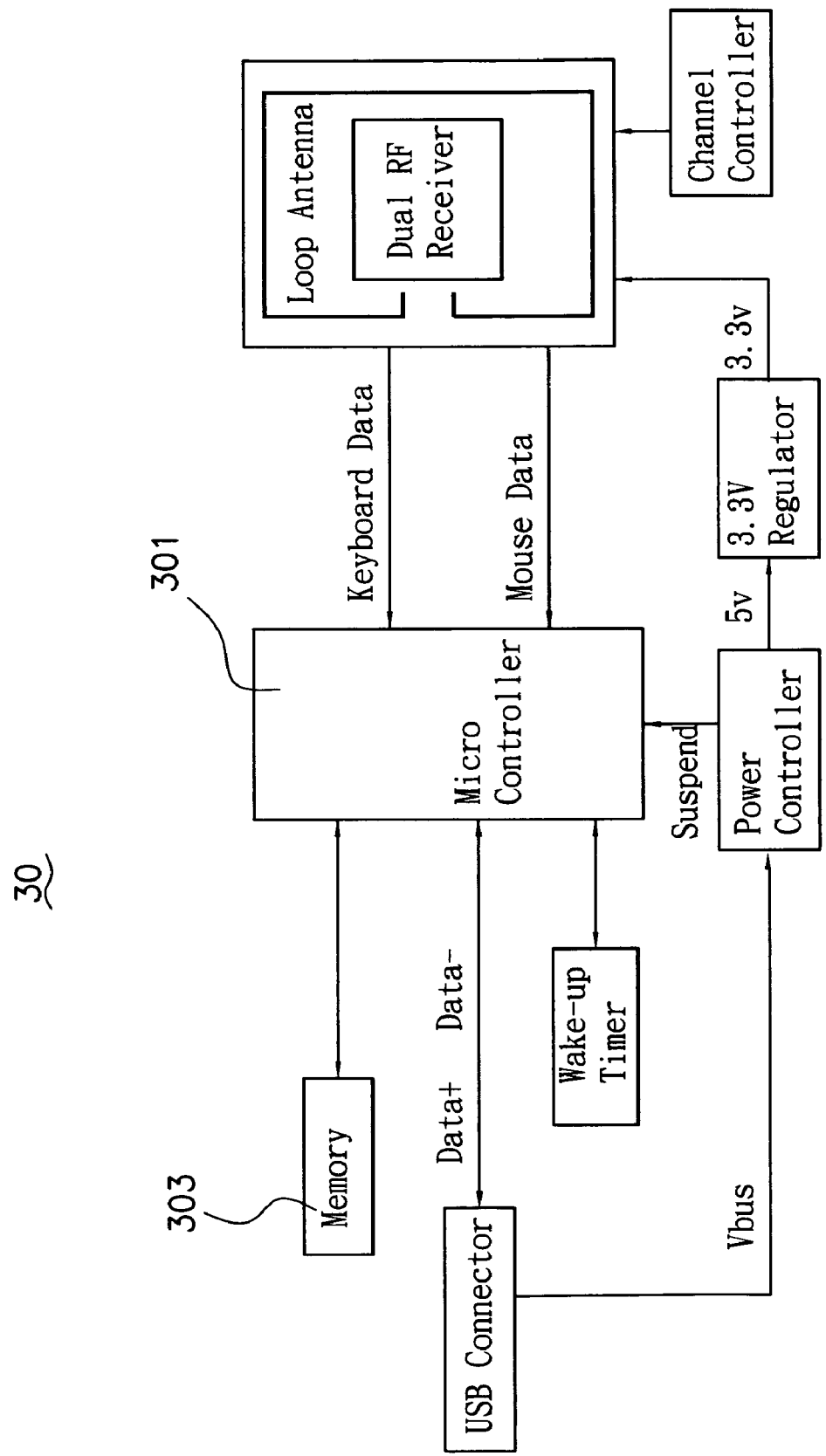
FIG. 3 is a block diagram illustrating the method of the present invention applied to a common wireless receiving device for the wireless mouse and the wireless keyboard.

Referring to FIG. 1 to 3, a wireless human input device according to the present invention basically includes wireless human transmitting devices 10, 20 and a wireless human receiving device 30. FIG. 1 illustrates an example of the wireless human transmitting device 10 is a wireless mouse. FIG. 2 illustrates an example of the wireless human transmitting device 20 is a wireless keyboard. FIG. 3 illustrates an example of the wireless human receiving device 30 is a common receiving device 30 of the wireless mouse and the wireless keyboard. The wireless human transmitting device 10, 20 used in the method of the present invention has a main feature that it is not necessary to provide a memory for storing identification codes of the wireless human transmitting devices 10, 20 and the identification codes are generated by micro controllers 101, 201 completely. Thus, no memory devices are required in the wireless human transmitting devices 10, 20 and fabrication cost of the wireless transmitting devices 10, 20 can be reduced. The main feature of the wireless human receiving device 30 used in the method of the present invention is setting the identification code, that is, the wireless human receiving device 30 has a predetermined identification code stored in a non-volatile memory device in advance. For instance, a value of the predetermined code is '55' and the value '55' is stored in the memory 303.

When the wireless human transmitting devices 10, 20 send packets to the wireless human receiving device 30 by way of wireless transmission such as radio, the identification codes contained in the packets play a role of being recognized. Hence, the wireless human transmitting devices 10, 20 are able to pair with the wireless human receiving device 30 with the aid of the identification codes to constitute a set of wireless human transmitting devices 10, 20 and a wireless human receiving device 30.

When the user sets up the wireless human input device at the first time, the common wireless human receiving device 30 shown in FIG. 3 is electrically connected to a computer by way of, for example, USB connector with USB cable connecting with the computer first. Then, the computer is powered on and the wireless mouse 10 shown in FIG. 1 is mounted with batteries or the wireless keyboard 20 shown in FIG. 2 is mounted with batteries too. The micro controllers 101, 201 are able to generate identification codes in advance, whose values are the same as the value of the predetermined identification code stored in the wireless human receiving device 30. For instance, the micro controllers 101, 201 can generate identification codes with values of '55' and the wireless human transmitting devices 10, 20 send packets to the wireless human receiving device 30 with the identification codes, whose values is the same as the predetermined identification code. Next, the computer executes program codes and the program codes are embodied as a driver of the wireless human input device. The program codes are mainly used for detecting if the wireless human receiving device 30 can receive data and read the memory 303 of the wireless human machine receiving device 30 normally. Then, the read data from memory 303 is compared with value of the predetermined identification code and if the comparison is "true", the read data is the same as the predetermined value. In this way, the computer is ordered to output a message of the wireless human input device operating normally.

Figure 4:
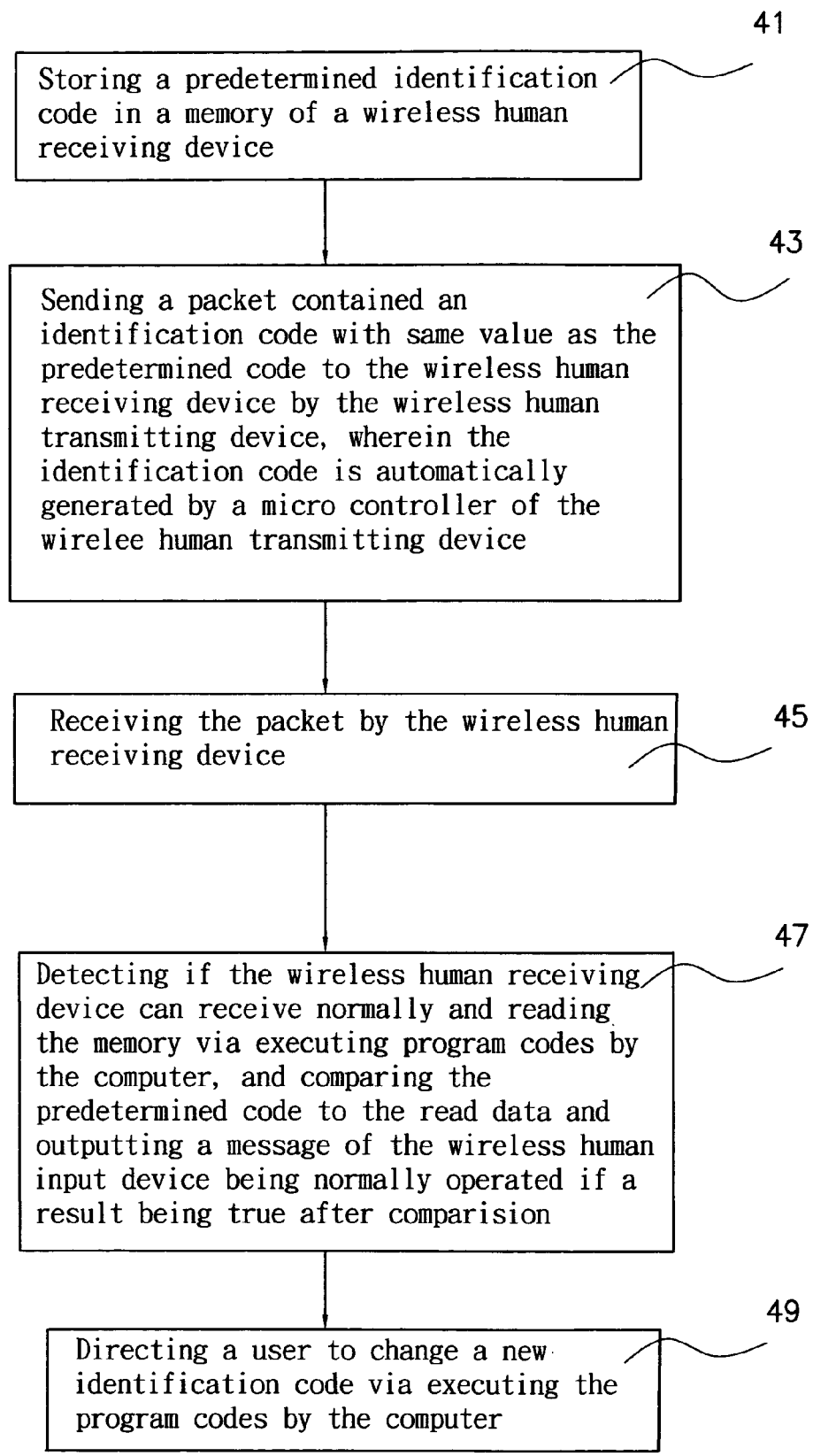
FIG. 4 is a flow chart according to the method of the present invention.
Figure 6:
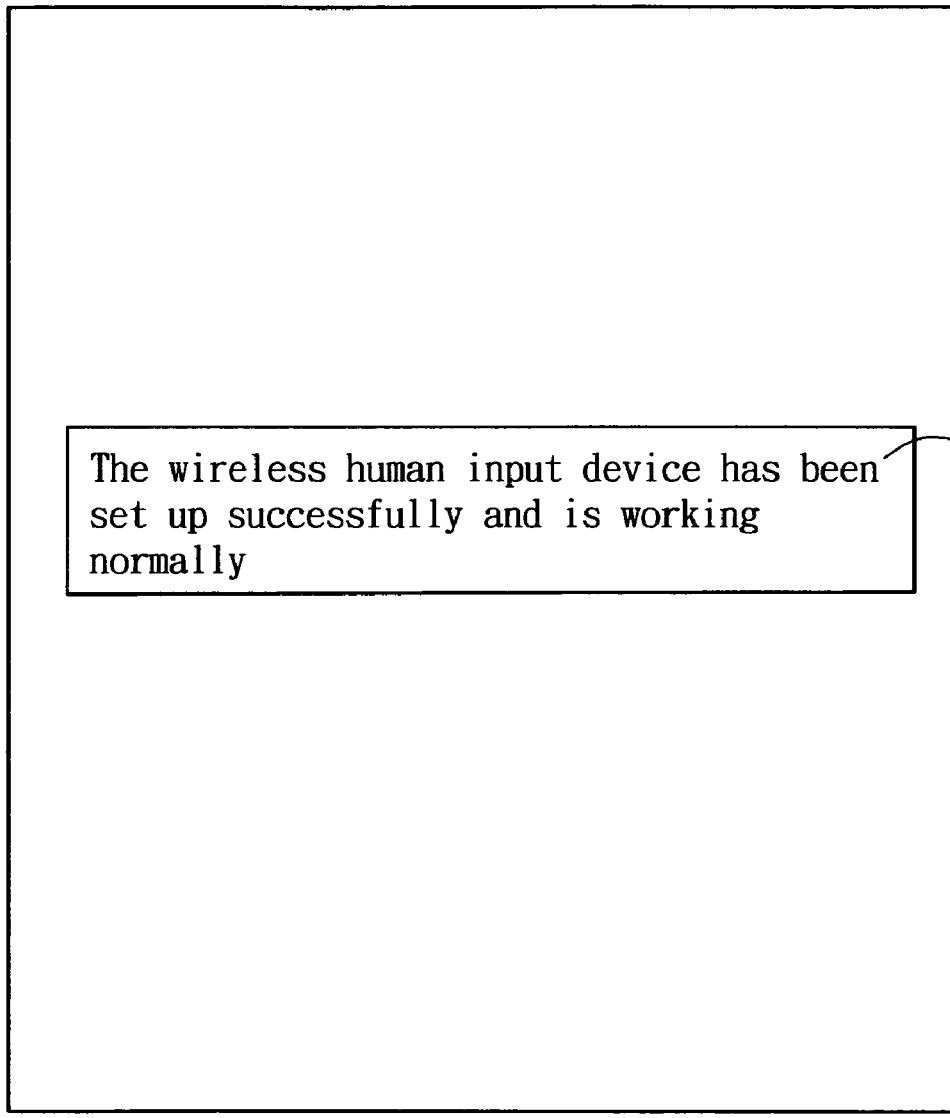
FIG. 6 is a message box shown on a monitor illustrating the wireless human input device being in a state of normal operation while program codes of the present invention are executed on a computer.

Referring to FIG. 4, a flow chart of the method according to the present invention is illustrated by way of block diagram. Step 41 is to store the predetermined identification code in a non-volatile memory 303 of a wireless human receiving device 30. As the foregoing, a way to embody step 41 is a predetermined identification code being assigned to the wireless human receiving device 30 before leaving the factory. For example, a numerical value '55' is the value for the predetermined identification code and stores it in the memory 303. Step 43 is that the wireless human transmitting devices 10, 20 send packets, which contain identification codes being the same value as the predetermined identification code, to the wireless human receiving device 30 during the wireless human transmitting device 10, 20 being set up at the first time. The identification codes are automatically generated by the micro controllers 101, 201. As the foregoing, a way to embody step 43 is the micro controller 101, 201 automatically generate identification codes with a numerical value '55', during the wireless human transmitting device 10, 20 being mounted batteries at the first time and the wireless human transmitting devices 10, 20 send packets, which contain identification codes of '55', to the wireless human receiving device 30. Step 45 is the wireless human receiving device 30 receiving the packets of step 43. Because the wireless human receiving device 30, which is first time set up for use, has a predetermined identification code being stored in advance as mentioned previously, the numerical value of the identification code is '55' so that the wireless human receiving device 30 should receive the packets with identification code of numerical value '55' in step 43 successfully. Step 47 is the computer detects if the wireless human receiving device 30 in step 45 can receive normally and the computer reads data in the memory 303 of the wireless human receiving device 30 via executing program codes in a checked state of normal receiving with the read data being compared with the predetermined identification code. In case of the result being true after comparison, the computer outputs a message, which indicates the wireless human input device being normally operated. As the foregoing, a way to embody step 47 is the computer executes the driver program of the wireless human input device and the computer checks if the packets received by the human receiving device 30 are correct and determine if the human receiving device 30 can receive the packets normally. In case of the receipt of the packets being determined as being normal, the screen of the computer can show a message of the wireless human input device operating normally such as displaying literal message 61 to notify the user that the wireless human input device has been set up successfully and is working normally. FIG. 6 shows the message of wireless human input device working normally on the display.

After outputting the message of the wireless human input device in step 47, the method according to the present invention further includes step 49, with which the computer directs the user to change a new identification code with a numerical value different from the predetermined identification code via executing program codes. The new identification codes are automatically generated with the micro controllers 101, 201 and the memory 303 of the wireless human receiving device 30 is used for storing the new identification codes. As the foregoing, a way to embody step 49 is that the computer can show a dialog box on the screen to interactive with the user by way of executing the driver so that the user can change to the identification code based on indication of the dialog box. After changing to the new identification code, the computer also can show the numerical value of the new identification code on the display. Due to the new identification code being able to be changed, it is possible to prevent the packets from being interfered during the wireless human receiving device 30 carrying out receiving work. Further, it is possible to prevent the packets from being interfered during the wireless human receiving device 30 carrying out receiving work when multiple persons use the same number of the identification code.

Figure 5:
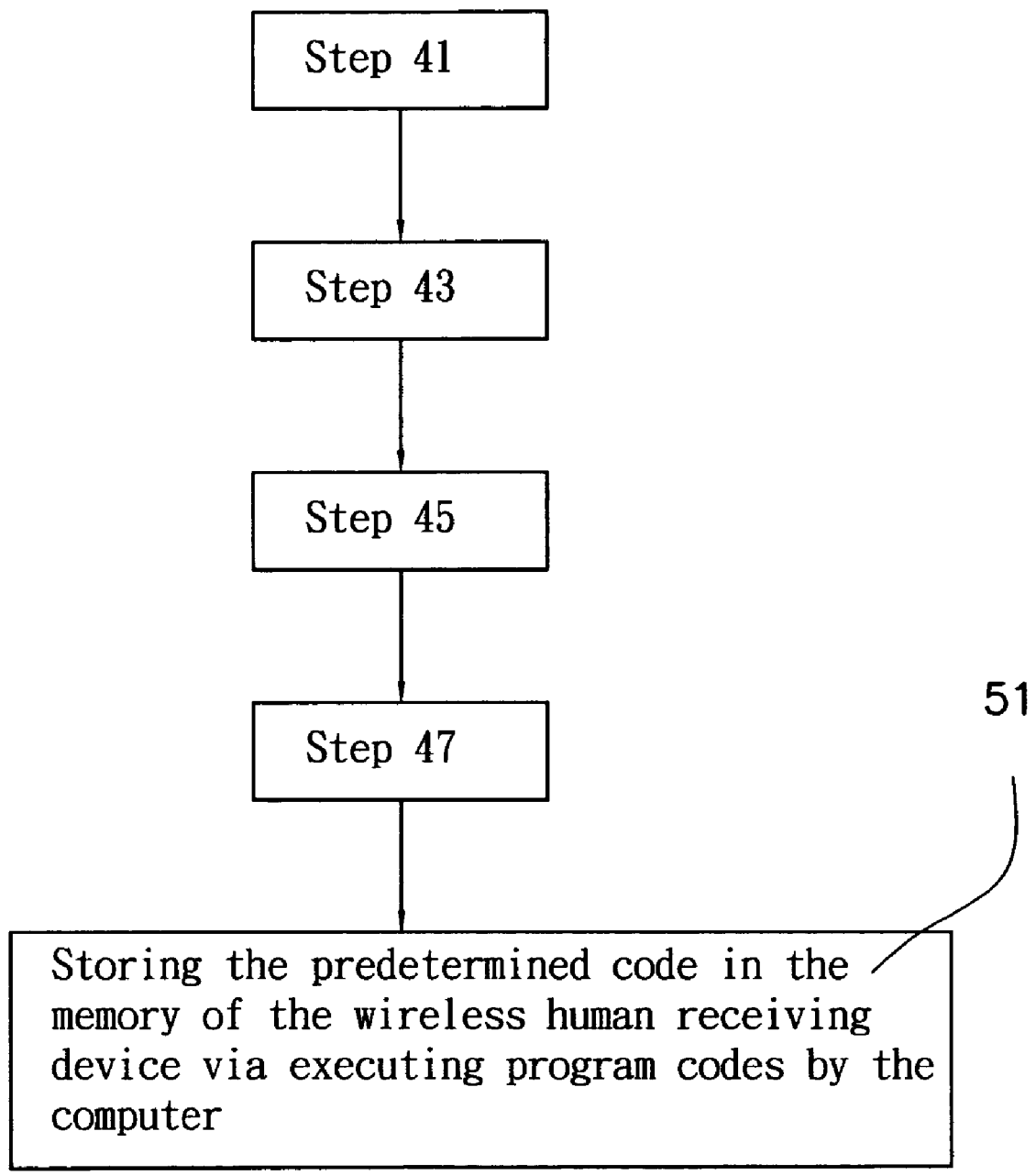
FIG. 5 is a flow chart according to the method of the present invention with which a wireless human receiving device being set with a predetermined identification code.

Referring to FIG. 5, the method of the present invention further includes step 51, with which the computer allows the memory 303 of the wireless human receiving device 30 to store the predetermined identification code via executing program codes. The major function of step 51 is to allow the user being able to force the predetermined identification code with a numerical value such as '55' being stored in the memory 303 and the program codes embodying step 51 can be contained in the preceding driver.

The method of the present invention makes the wireless human transmitting devices 10, 20 possible to save memory devices so as to reduce fabricating cost of the wireless human transmitting device 10, 20 directly. In addition, because the predetermined identification code has been stored in the memory 303 in advance before leaving the factory, the user can set up and use the wireless human input devices successfully in case of the user first time performing the set-up. The user can be clearly acknowledged the wireless human input devices having been set up successfully. Furthermore, the present invention can avoid failure resulting from the identification codes of the wireless human transmitting devices 10, 20 being different from the identification code of the wireless human receiving device 30 during being set up for the first time.

The wireless human input devices can be wireless joy stick transmitting device, wireless joy stick receiving device, wireless pointing transmitting device, wireless pointing receiving device and etc.

While the invention has been described with reference to the preferred embodiments thereof, it is to be understood that modifications or variations may be easily made without departing from the spirit of this invention, which is defined by the appended claims.

What is claimed is:

1. A method performed by a wireless data input device comprising a wireless receiving device and a wireless transmitting device, wherein the wireless transmitting device comprises a microcontroller, the method comprising:
   generating an initial identification code at the microcontroller without reading the identification code from any memory, the initial identification code identifying the wireless transmitting device;
   sending at least one packet from the wireless transmitting device to the wireless receiving device, wherein the at least one packet comprises the initial identification code generated by the microcontroller;
   receiving the at least one packet at the wireless receiving device;
   determining whether the initial identification code in the at least one packet received at the wireless receiving device corresponds to a predetermined code stored in a memory to confirm that the wireless receiving device is receiving normally from the wireless transmitting device;
   in response to confirming that the wireless receiving device is receiving normally, causing the wireless transmitting device to automatically generate a new identification code at the microcontroller without reading the new identification code from any memory, the new identification code identifying the wireless transmitting device;

sending at least one packet from the wireless transmitting device to the wireless receiving device, wherein the at least one packet comprises the new identification code generated by the microcontroller;

receiving the at least one packet comprising the new identification code at the wireless receiving device;

storing the new identification code received at the wireless receiving device in the memory;

receiving, at the wireless receiving device, further packets from the wireless transmitting device comprising the new identification code;

for each of the further packets received by the wireless receiving device, determining whether the received packet comprises the new identification code;

if the received packet comprises the new identification code, recognizing the received packet as having been transmitted by the wireless transmitting device; and if the received packet does not comprise the new identification code, ignoring the received packet.

2. The method of claim 1, further comprising:

connecting the wireless receiving device to a computer having a display device; and if the received packet comprises the initial identification code and the initial identification code corresponds to the predetermined code stored in the memory, displaying a message on the display device indicating that the wireless receiving device is receiving normally.

3. The method of claim 1, wherein the wireless transmitting device is a user operated portion of one of a wireless mouse, a wireless keyboard, a wireless joy stick, or a wireless pointing device.

4. The method of claim 1, wherein the wireless receiving device is a wireless receiver for one of a wireless mouse, a wireless keyboard, a wireless joy stick, or a wireless pointing device.

5. The method of claim 1, wherein the wireless receiving device comprises a non-volatile memory, and the method further comprises storing the new identification code in the non-volatile memory of the wireless receiving device.

6. The method of claim 5, wherein determining whether each of the further packets received by the wireless receiving device comprises the new identification code includes:

obtaining the identification code of the received packet;

reading the new identification code from the non-volatile memory;

comparing the identification code of the received packet to the new identification code read from the non-volatile memory; and determining the received packet comprises the new identification code when the identification code of the received packet corresponds to the new identification code read from the non-volatile memory of the wireless receiving device.

7. The method of claim 6, further comprising:

in response to first setting up the wireless transmitting device, sending the at least one packet comprising the initial identification code from the wireless transmitting device to the wireless receiving device.

8. The method of claim 7, wherein the sending of the at least one packet comprising the initial identification code from the wireless transmitting device is triggered by inserting batteries into the wireless transmitting device.

9. The method of claim 1, wherein at least one of the further packets received by the wireless receiving device comprises device displacement information, and the method further comprises:

if the received packet comprises the new identification code, processing the device displacement information contained in the received packet.

10. The method of claim 1, wherein at least one of the further packets received by the wireless receiving device comprises key press information, and the method further comprises:

if the received packet comprises the new identification code, processing the key press information contained in the received packet.

11. A wireless system comprising:

a computing device;

a wireless receiving device communicatively coupled to the computing device and configured to receive data packets wirelessly, the wireless receiving device being further configured to communicate at least a portion of the data in the received data packets to the computing device; and a wireless transmitting device comprising a microcontroller configured to:

generate an initial identification code without having first read the initial identification code from any memory, the initial identification code identifying the wireless transmitting device;

send at least one packet to the wireless receiving device, wherein the at least one packet comprises the initial identification code generated by the microcontroller; and in response to a determination by the wireless receiving device that the initial identification code in the at least one packet received at the wireless receiving device corresponds to a predetermined code stored in a memory:

automatically generate a new identification code without having first read the new identification code from any memory, the new identification code identifying the wireless transmitting device; and send at least one packet comprising the new identification code to the wireless receiving device for storing in the memory;

wherein:

in response to operation of the wireless transmitting device, the wireless transmitting device is configured to transmit input data to the wireless receiving device in one or more data packets also comprising the new identification code, the computing device is further operable to recognize data packets received by the wireless receiving device comprising the new identification code as having been transmitted by the wireless transmitting device, and the computing device is further operable to ignore data packets received by the wireless receiving device not comprising the new identification code.

12. The wireless system of claim 11, wherein the computing device is configured to determine that the wireless receiving device is operating normally when the wireless receiving device receives a packet comprising the initial identification code generated by the microcontroller.

13. The wireless system of claim 12, wherein the computing device comprises a display and is further operable to display a message indicating whether the wireless receiving device is operating normally.

14. The wireless system of claim 12, wherein in response to the wireless transmitting device being first set up for use, the wireless transmitting device is configured to transmit the at least one packet comprising the initial identification code to the wireless receiving device.

15. The wireless system of claim 11, wherein the wireless transmitting device is a user operated portion of one of a wireless mouse, a wireless keyboard, a wireless joy stick, or a wireless pointing device, and
    the wireless receiving device is a wireless receiver for the one of the wireless mouse, the wireless keyboard, the wireless joy-stick, or the wireless pointing device.

16. A wireless transmitting device comprising a microcontroller, wherein the microcontroller is configured to:
    generate an initial identification code without having first read the initial identification code from any memory, the initial identification code identifying the wireless transmitting device; and
    send at least one packet to a wireless receiving device, wherein the at least one packet comprises the initial identification code generated by the microcontroller,
    wherein, in response to a determination by the wireless receiving device that the initial identification code in the at least one packet received by the wireless receiving device corresponds to a predetermined code stored in a memory, the microcontroller is further configured to:
        automatically generate a new identification code without having first read the new identification code from any memory, the new identification code identifying the wireless transmitting device; and
        send at least one packet comprising the new identification code to the wireless receiving device for storing in the memory, the new identification code enabling the wireless receiving device to identify packets received from the wireless transmitting device while ignoring packets having been transmitted by other devices not identified by the new identification code.

17. The wireless transmitting device of claim 16, wherein in response to the wireless transmitting device being first set up for use, the wireless transmitting device is configured to transmit the at least one packet comprising the initial identification code to the wireless receiving device.

18. The wireless transmitting device of claim 17, wherein transmission of the at least one packet comprising the initial identification code from the wireless transmitting device is triggered by inserting batteries into the wireless transmitting device.

19. The wireless transmitting device of claim 16, wherein the wireless transmitting device is a user operated portion of one of a wireless mouse, a wireless keyboard, a wireless joy stick, or a wireless pointing device.

* * * * *

UNITED STATES PATENT AND TRADEMARK OFFICE
CERTIFICATE OF CORRECTION

PATENT NO.        : 8,154,510 B2  
APPLICATION NO.   : 10/813096  
DATED             : April 10, 2012  
INVENTOR(S)       : Kuo et al.

Page 1 of 1

It is certified that error appears in the above-identified patent and that said Letters Patent is hereby corrected as shown below:

Title Page, Item (75), under "Inventors", in Column 1, Lines 2-3, delete "Adrianus Carolus-Antonius Vander Vorst" and insert -- Adrianus Carolus Antonius Van der Vorst --, therefor.

In Fig. 4, Sheet 4 of 6, for Tag "43", in Line 8, delete "Wirelee" and insert -- Wireless --, therefor.

In Column 2, Line 11, delete "Fig. 1 to 3," and insert -- FIGS. 1 to 3, --, therefor.

Signed and Sealed this  
Eleventh Day of September, 2012

David J. Kappos  
*Director of the United States Patent and Trademark Office*